3,426,038
α-HALOMETHYL-1-THENOYL, FUROYL OR PYRROL CARBONYL-3-INDOLYLACETIC ACIDS
Tsung-Ying Shen, Westfield, and Lewis H. Sarett, Princeton, N.J., assignors to Merck & Co., Inc., Rahway, N.J., a corporation of New Jersey
No Drawing. Continuation-in-part of application Ser. No. 222,222, Sept. 7, 1962. This application Apr. 29, 1965, Ser. No. 452,018
U.S. Cl. 260—326.12          1 Claim
Int. Cl. C07d 27/56, 63/16, 5/26

This application is a continuation-in-part of our co-pending application, Ser. No. 222,222, filed Sept. 7, 1962, now U.S. Patent No. 3,242,192.

This invention relates to new chemical compounds. More particularly, it relates to a new class of compounds of the indole family. Still more particularly, it is concerned with new α-halogenated methyl 3-indolylacetic acids having a heterocyclic aromatic carboxylic acyl radical derived from furyl, thiophene or pyrrole carboxylic acids. It is concerned further with salts, esters and amide derivatives of such compounds.

The new heteroaroyl indolylacetic acid compounds of this invention have the general structural formula:

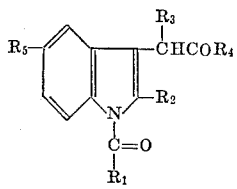

wherein $R_1$ is selected from the group consisting of furane thiophene and pyrrole and substituted thiophene furane and pyrrole in which said substituents are selected from the group consisting of halogen, lower alkenyl, lower alkylthio, lower alkoxy, monofluoromethyl, difluoromethyl, trifluoromethyl, phenoxy, phenyl, lower cycloalkyl, lower alkoxyphenyl, halogenophenyl, furyl, pyridyl, phenyl lower alkyl, lower alkanoyl, lower alkyl, lower alkoxyl lower alkyl, benzoyl, cyanomethyl, diloweralkylsulfonyl, diloweralkyl carboxamido, cyano, carb-lower-alkoxy, lower alkoxy phenyl sulfonyl, lower alkyl sulfonyl, phenylthio, benzylthio, lower alkylthio, lower alkyl, benzyloxy lower alkyl, furfurylthio lower alkyl, nitro, amino, di(lower alkyl)amino, lower alkylamino, lower alkanoylamino, hydroxy and benzyloxy.

A critical feature of the above compounds is the presence of an heteroaroyl radical

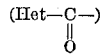

derived from furane, thiophene or pyrrole attached to the N–1 position of the indole nucleus. These acyl groups may be further substituted in the aromatic rings thereof with hydrocarbon groups or with functional substituents. The term "functional substituent," as used herein, is meant one other than hydrogen or hydrocarbon.

Among the preferred aroyl substituents

that are operable herein are the furoyl, thenoyl, pyrrole carboxy groups. The aromatic rings of such groups may contain, and in the preferred compounds do contain, at least one functional substituent. This substituent may be a hydroxy or an etherified hydroxy (hydrocarbonxy) group such as a lower alkoxy, aryloxy or an aralkoxy radical, e.g., methoxy, ethoxy, isopropoxy, propoxy, allyloxy, phenoxy, benzyloxy, halobenzyloxy, lower alkoxybenzyloxy and the like. Said functional substituent may also be a nitro group, a halogen, an amino group or a substituted amino group, representative examples of which that might be mentioned are acylamino, amineoxide, ketimines, urethanes, lower alkylamino, lower dialkylamino, amidine, acylated amidines, hydrazine or a substituted hydrazine, alkoxyamines and sulfonated amines. Furthermore, said functional substituent may be a mercapto or a substituted mercapto radical of the type exemplified by alkylthio groups such as methylthio, ethylthio, and propylthio and arylthio or aralkylthio groups, e.g., benzylthio and phenylthio. The N–1 aroyl radical may, if desired, be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde, azide, amide, hydrazide and the like, or an aldehyde derivative of the type represented by acetals or thioacetals. In the preferred compounds, the N–1 aroyl radical is thenoyl and the functional substituent is in the 5-position of the ring.

$R_2$, situated in the 2-position of the indole ring nucleus, may be hydrogen, although it is preferred that there be present at this position of the molecule a hydrocarbon radical having less than nine carbon atoms. Lower alkyl groups such as methyl, ethyl, propyl or butyl are the most satisfactory although aryl, alkaryl and aralkyl groups are also advantageous, such as phenyl, benzyl and tolyl. Furthermore, the alkoxy, halo, amino, substituted amino and nitro substituted derivatives of the foregoing are within the purview of this invention as are indoles having at the 2-position an unsaturated aliphatic radical such as allyl or vinyl or a cyclic aliphatic residue of the type cyclohexyl.

A further critical feature of the foregoing compounds is that they are 3-indolylacetic acids in which the acetic acid α-carbon atom is further substituted by a halogenated methyl group ($R_3$), including the mono-, di- and tri-halo substituted methyls, such as, for example, trifluoromethyl, difluoromethyl, dibromomethyl, fluorochloromethyl, chloromethyl, fluoromethyl, and the like.

In the preferred compounds of the invention, $R_5$ is a lower alkyl, lower alkoxy, nitro, amino or substituted amino group. Examples of the alkyls and alkoxys that are embraced herein are methyl, ethyl, propyl, t-butyl, methoxy, ethoxy, isopropoxy and the like radicals. Examples of the substituted aminos are those derived from alkyl amines such as methyl amine, ethyl amine, isopropyl amine, butyl amine, diethyl amine, ethyl-sec-butyl amine, diisopropyl amine and the like, alkanolamines such as ethanolamine, diethanolamine, 2-amino-1-butanol, morpholine and the like, aryl amines such as aniline, diphenylamine and the like, mixed aromatic-aliphatic amines such as monomethylaniline, monoethylaniline and the like, aralkyl amines such as benzylamine, β-phenylethylamine and the like, halo-substituted aliphatic or aromatic amines such as β-chloroethylamine, para-chloroaniline, parachlorobenzyl amine and the like, and other substituted aliphatic or aromatic amines such as β-methoxyethyl amine, para-tolyl amine, para-methoxy aniline, and the like. $R_5$ is not limited to the foregoing classes of substituents, however, and may, if desired, represent substituents such as hydrogen, aryl, aryloxy, hydroxy, mercapto, halo, haloalkyl such as —$CF_3$, —$CHF_2$ and the like, nitro, haloalkyl, cyano, sulfamyl, sulfoxide, aminomethyl, substituted aminomethyl, carboxy and carboalkoxy groups.

In addition to the α-(3-indolyl)acetic acids described herein, the esters, salts and amide derivatives thereof represent an additional aspect of the invention. The esters are important intermediates in the synthesis of the free acids, and in many cases are themselves of importance as end products. Among the preferred esters are the lower alkyl esters such as the methyl, ethyl, propyl or t-butyl esters, and the aralkyl esters such as the benzyl, p-halobenzyl, and like esters having less than nine carbon atoms. The salts of these new α-(1-heteroaroyl-3-indolyl)-acetic acids can be obtained by treatment of the free acid with base under mild conditions. In this manner there may be obtained salts of alkali metals such as lithium, sodium and potassium, the aluminum or magnesium salts, or salts of alkaline earth metals such as barium and calcium. Salts of organic amines such as alkylamine, morpholine, choline, methyl cyclohexylamine or glucosamine may be obtained by reacting the acid with the appropriate organic base. Salts of heavy metals such as zinc and iron are also within the purview of this invention.

The following compounds are representative of those contemplated by this invention and which may be prepared by the procedures discussed herein-below:

methyl-α-trifluoromethyl-α-[1-(5-chloro-2-thenoyl)-2-methyl-5-methoxy-3-indolyl]acetate,
α-difluoromethyl-α-[1-(5-chloro-2-furoyl)-2,5-dimethyl-3-indolyl]-acetic acid,
methyl α-trifluoromethyl-α-[1-(5-methylthio-2-thenoyl)-2-methyl-5-methoxy-3-indolyl]-acetate,
α-trifluoromethyl-α-[1-(4,5-dichloro-2-thenoyl)-2-methyl-5-methoxy-3-indolyl]-acetamide,
ethyl α-difluorochloromethyl-α-[1-(4-methoxy pyrrole-2-carboxy)-2-methyl-5-methoxy-3-indolyl]-acetate,
benzyl α-fluoromethyl-α-[1-(3-thenoyl)-2-ethyl-5-methyl-3-indolyl]-acetate,
propyl α-trifluoromethyl-α-[1-(2,5-dimethyl-3-furoyl)-2-methyl-5-methoxy-3-indolyl]-acetate,
α-trifluoromethyl-α-[1-(5-acetyl-2-furoyl)-2-methyl-5-methoxy-3-indolyl]-acetic acid and the like.

The α-halomethyl-1-heteroaroyl-3-indolyl acetic acid compounds of this invention and their corresponding esters and amides have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 1.0–2000 mg. per day are useful in control of arthritic conditions, depending on the activity of the specific compound and the reaction sensitivity of the patient.

The novel α-halogenated methyl 3-indolylacetic acids of this invention are prepared from 3-α-haloacetyl indoles that have been acylated in the N–1 position of the indole nucleus with an aromatic carboxylic acyl radical (aroyl or heteroaroyl) of less than three fused rings. These useful synthetic intermediates are also novel compounds and an additional feature of this invention and may be chemically represented as follows:

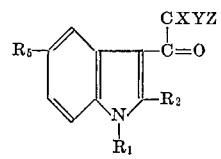

wherein X, Y and Z are selected from the class consisting of hydrogen, and halogen atoms, at least one of which is a halogen, preferably chlorine, bromine or fluorine, and $R_1$, $R_2$ and $R_5$ are as previously defined. They are preferably prepared by reacting an indole that is unsubstituted in the N–1 and C–3 positions, but having the desired $R_2$ and $R_5$ embellishments, with a member selected from the group consisting of halogenated acetic acid anhydride and halogenated acetyl halide to form the corresponding 3-haloacetyl indole which is then treated with an acylating agent capable of introducing the desired aromatic carboxylic acyl moiety in the N–1 position of the indole nucleus. Alternatively, the foregoing two steps may be reversed, that is, the starting indole may first be acylated in the N–1 position with the appropriate aroyl or heteroaroyl moiety followed by the introduction of the α-haloacetyl moiety in the C–3 position.

In either instance, the reaction of the indole with the respective halogenated acetic acid anhydride or halogenated acetyl halide is carried out by heating the reagents together at temperatures above 50° C. and preferably in the range of from 100–250° C. Preferably, the reaction is run at the reflux temperature of the particular halogenated acetic acid anhydride or halogenated acetyl halide employed. In the case of the lower boiling acetic anhydrides or acetyl halides, a closed reaction vessel will be advantageous.

The acylation reaction is preferably conducted by intimately contacting the N–1 unsubstituted indole with an aroyl or heteroaroyl acid halide in the presence of a strongly basic condensing agent, such as sodium hydride, potassium hydride, sodamide, an alkyl lithium or an alkali metal alkoxide, in a suitable solvent medium. The metallo derivative of the indole reactant forms first and this, in turn, reacts with the aroyl or heteroaroyl halide to form the corresponding N–1 acylated indole.

An alternative method of acylating the 1-position is by use of an activated aryl ester of the acylating acid, such as the p-nitrophenyl ester. This latter is prepared by mixing the acid and p-nitrophenol in tetrahydrofuran and adding dicyclohexyl carbodiimide in tetrahydrofuran slowly. The dicyclohexylurea which forms is removed by filtration and the p-nitrophenyl ester is recovered from the filtrate. Alternatively, there can also be used the anhydride, azide or thiophenolic ester of the acylating acid. Whichever is used, the acylation of the α-(3-indolyl)-lower aliphatic acid starting material is achieved by forming a sodium salt of said material with sodium hydride in an anhydrous solvent and adding the acylating agent.

In the acylation step, the reaction medium is not unduly critical and it is preferred to employ anhydrous organic solvents such as, for example, the alkylformamides, such as dimethylformamide, diethylformamide and the like, aromatic hydrocarbons such as benzene, toluene and xylene, mixtures of said dialkylformamides and said aromatic hydrocarbons, ethers such as diethyl ether, 1,2-dimethoxyethane, tetrahydrofuran and diphenyl ether and nitrobenzene. The temperature of the reaction is not critical although it is preferred to carry out the acylation at temperatures ranging from 0–30° C. Lower temperatures may be employed if the particular reactants are unduly susceptible to decomposition.

In a preferred embodiment of this invention, the process of synthesizing the subject α-halomethyl 3-indolylacetic acids comprises condensing 3-α-haloacetyl indole that is acylated in the N–1 position of the indole nucleus with an aromatic carboxylic acyl radical (aroyl or heteroaroyl) of less than three fused rings with an α-halo ester to form a glycidic ester, converting said glycidic ester to its corresponding acid, decarboxylating said acid to an aldehyde,[1] treating said aldehyde with hydroxylamine to form the corresponding oxime, dehydrating said oxime to form the corresponding nitrile, treating said nitrile with alkanol and hydrogen halide to form an imino-alkyl ester hydrohalide which upon hydrolysis, forms the corresponding alkyl ester, and hydrolyzing said alkyl ester under mild conditions.

Accordingly, the α-halogenated methyl-3-indolylacetic acids of this invention may be prepared by reacting a halogenated acetic acid anhydride with indole itself or an indole that has been presubstituted in the 2- and/or 5-positions with the desired embellishments, thereby introducing an α-haloacetyl group in the 3-position of the indole nucleus:

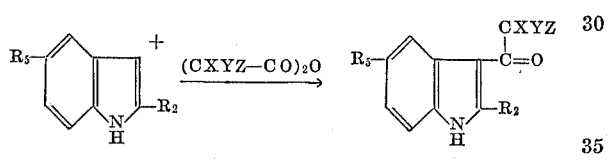

wherein $R_2$ and $R_5$ are substituents as previously described and X, Y and Z are selected from the group consisting of hydrogen and halogen atoms, at least one being a halogen. The resulting 3-α-haloacetyl indole is then acylated in the N–1 position by treatment with an acylating agent such as an aroyl or heteroaroyl halide:

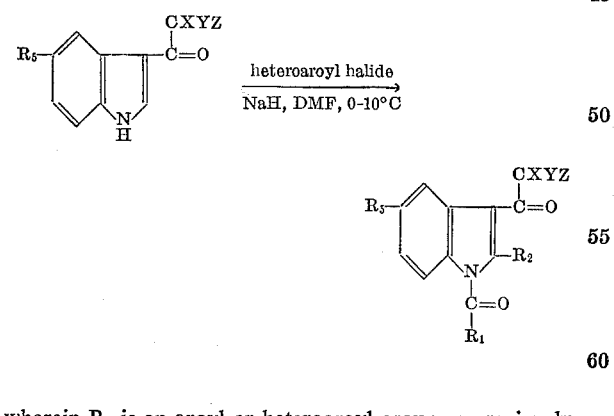

wherein $R_1$ is an aroyl or heteroaroyl group as previously described. Alternatively, the foregoing two steps may be reversed, that is, the starting indole could first be acylated in the N–1 position with the heteroaroyl moiety, followed by the introduction of the α-haloacetyl moiety in the 3-position. In either event, the resulting product is then condensed with an α-halo ester such as chloroacetic acid ester in the presence of a basic condensing agent such as sodium ethoxide, sodium amide or sodium hydride to form the corresponding α,β-epoxy ester (glycidic ester):

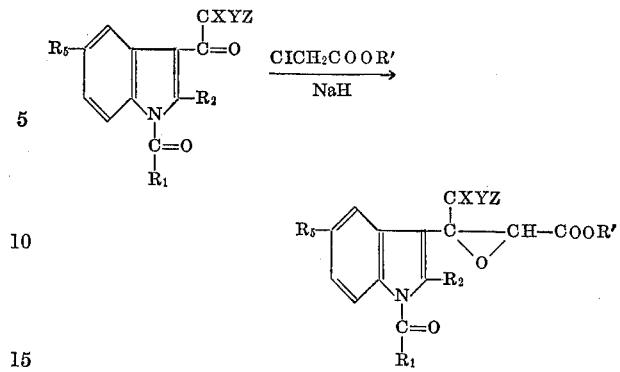

wherein R′ is an alkyl or aralkyl radical. The glycidic ester condensation reaction is carried out under anhydrous conditions, with or without a solvent medium, and preferably in an inert atmosphere. The reaction is preferably run at 0° C. or below, temperatures as low as −80° C. being advantageous. After reaction periods ranging from a few hours to a few days, the reaction mixture is treated with dilute acid and the organic product extracted in the usual way by suitable organic solvents or separated by vacuum distillation. The resulting glycidic ester is then converted to the corresponding acid by mild alkaline hydrolysis, followed by decarboxylation to yield an aldehyde degraded by one carbon atom:

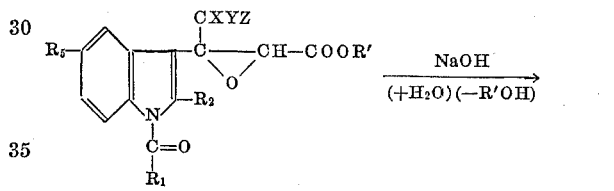

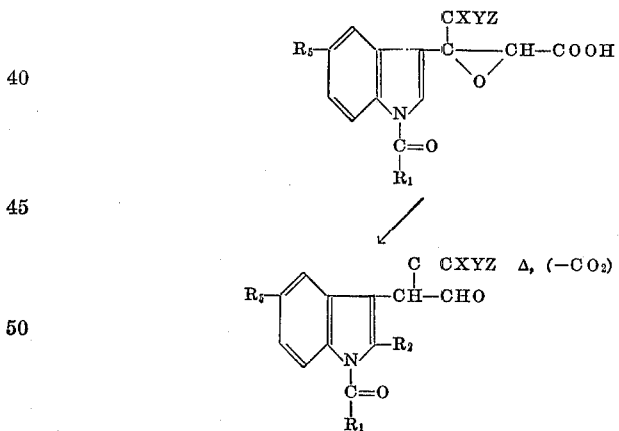

Alternatively, when R′ above is a tertiary alkyl radical, the glycidic ester is preferably converted to the degraded aldehyde by heating to the decomposition point, as, for example, by direct pyrolysis at 100°–200° C., under nitrogen and in the presence of powdered copper:

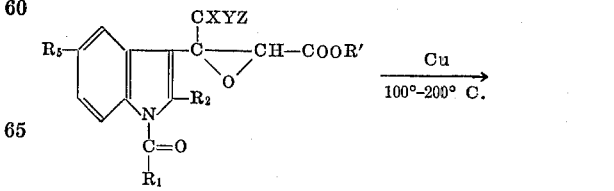

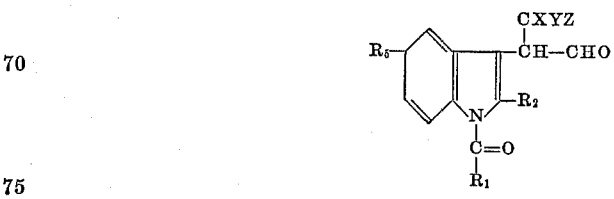

---

[1] A discussion of the formation of glycidic esters and their conversion to aldehydes will be found in Organic Reactions, vol. V, Adams et al., chapter 10 (1949), published by John Wiley & Sons, Inc. (New York).

The foregoing aldehydes may be converted to an exime by the usual treatment with hydroxylamine, such as, for example, by treatment with hydroxylamine acetate in aqueous ethanol to which a base is added with warming:

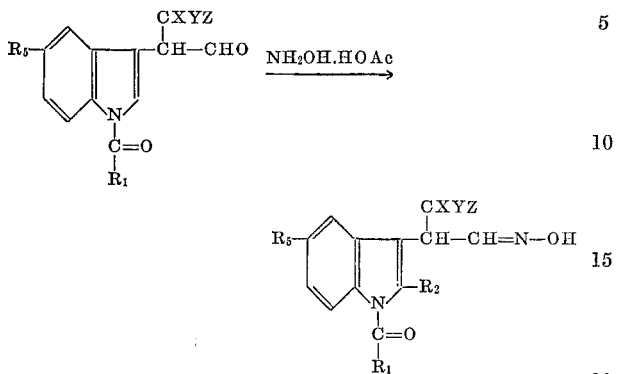

The resulting oxime is dehydrated to a nitrile as, for example, by treatment with a mild dehydrating agent such as acetic anhydride, or, preferably, by treatment with an alkyl or aryl chloroformate in the presence of base to form the corresponding alkyl or aryl carbonate ester, said carbonate ester then being pyrolyzed to yield the corresponding nitrile:

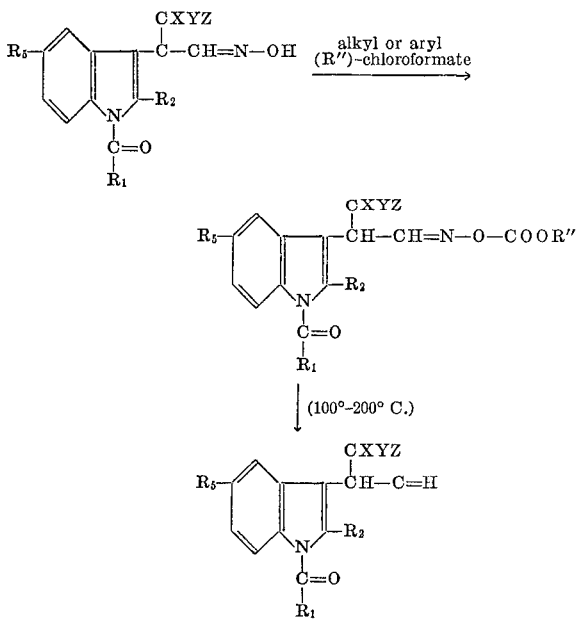

The resulting nitrile may be partially hydrolyzed, under mild alkaline or acidic conditions, to form the corresponding amides of this invention which, upon further hydrolysis yields the corresponding acids themselves. Preferably, the resulting nitrile is converted to an alkyl ester by means of an intermediate imino-alkyl ester hydrohalide synthesis followed by hydrolysis. For example, the nitriles are treated in an alkanol (R'OH) solution with a hydrogen halide, such as hydrogen chloride and hydrogen bromide, in the strict absence of water to form the corresponding imino-alkyl ester hydrohalide. The addition of water to the reaction mixture leads to hydrolysis of the imino-ester with formation of the corresponding alkyl ester and ammonium chloride:

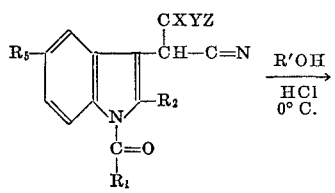

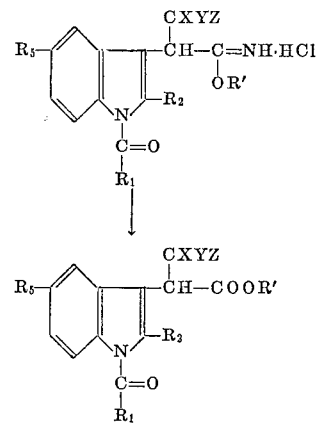

Said esters, which are embraced within the purview of this invention, are then hydrolyzed under mildly alkaline or mildly acidic conditions to yield the corresponding α-halomethyl-3-indolylacetic acids of this invention:

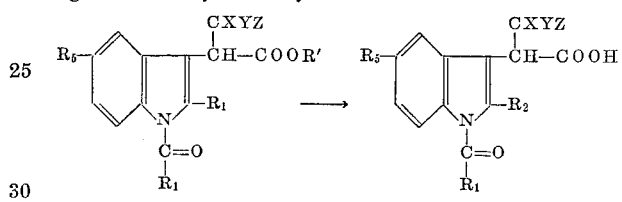

However, since the 1-acyl group of the above alkyl ester product may also undergo some hydrolysis, said acids are usually obtained in admixture with the corresponding N-1 unsubstituted (deacylated) α-halomethyl-3-indolylacetic acid and the heteroaroyl moiety in its acid form. The novel acids of this invention are separated and recovered from such mixtures by conventional techniques such as fractional crystallization or by means of chromatography using a silica gel column and mixtures of ether-petroleum ether as the eluent.

The α-halogenated methyl 3-indolylacetic acid amides of this invention, acylated in the N-1 position with a heteroaryl carboxylic acyl radical, may be prepared from the corresponding α-halogenated methyl 3-indolylacetic acids according to conventional techniques for the preparation of amides and N-substituted amides. For example, the respective acid may be converted to a symmetrical anhydride in the presence of a mild dehydrating agent such as dicyclohexyl carbodiimide and then treated with ammonia to yield the corresponding amide, or with a primary or secondary amine having the desired substituents in an inert solvent to yield the corresponding substituted amides. Alternatively, the respective acid may be converted to a mixed anhydride by treatment with a non-hydroxylic base such as, for example, a tertiary alkyl amine, pyridine and the like, to yield an acid salt, followed by treatment with an acid halide such as, for example an alkyl or aryl chloroformate, phosphorous, oxychloride, thionyl chloride and the like, to yield the mixed anhydride which may then be treated with ammonia, primary amines or secondary amines to yield the corresponding amides. In addition, the α-halomethyl-3-indolylacetic acid amides of this invention may be prepared by the mild acid hydrolysis of the corresponding α-halomethyl-3-indolyl acetonitriles.

Among the primary and secondary amines that are operable herein are the alkyl amines such as methyl amine, ethyl amine, isopropyl amine, butyl amine, diethylamine, ethyl-sec-butylamine, diisopropyl amine and the like, alkanolamines such as ethanolamine, diethanolamine, 2-amino-1-butanol, morpholine and the like, aryl amines such as aniline, diphenylamine and the like mixed aromatic-aliphatic amines such as monomethylaniline, monoethylaniline and the like, aralkyl amines such as benzylamine, β-phenylethylamine and the like, halo-substituted aliphatic or aromatic amines such as β-chloroethyl amine, para-chloroaniline, para-chlorobenzyl amine and the like, and other substituted aliphatic or aromatic amines such as β-methoxyethyl amine, para-tolyl amine, para-methoxy aniline, and the like.

The α-halogenated methyl 3-indolylacetic acids may also be used to prepare the corresponding esters of this invention. For example, the respective acid may first be converted to symmetrical or mixed anhydrides as previously described and then reacted with a desired alkyl or aralkyl alcohol in the presence of a non-hydroxylic base such as, for example, a tertiary alkyl amine, pyridine and the like, to yield the corresponding alkyl or aryl ester.

The synthesis of various compounds of this invention having on the indole ring system a 5-substituent which has a nitrogen attached to the homocyclic ring of the indole is generally base on the 5-nitro compound which may subsequently be transformed into the desired 5-substituent. Such transformation can be carried out in a number of ways. Reduction of the 5-nitro groups gives a 5-amino group. Reaction of the amino with alkyl halides gives mono and dialkyl amino groups. If the alkyl halide is a dihaloalkylene group (e.g., 1,4-dibromobutane) a heterocyclic ring (e.g., pyrrolidino) is formed. Similarly, bis(O-chlorethyl)ether will give an N-morpholine compound. Alkylation can also be carried out simultaneous with reduction, as e.g., with formaldehyde and Raney nickel and hydrogen. Acylation can similarly be carried out on the 5-amino compounds or on the 5-nitro (with simultaneous reduction) to give 5-acylamido compounds. The 5-amino group can be reacted with isocyanates to give 5-ureido compounds.

This invention can be illustrated by the following examples:

EXAMPLE 1

Preparation of 2-methyl-3-trifluoroacetyl-5-methoxyindole

A mixture of 20 g. of 2-methyl-5-methoxyindole and 195 g. of trifluoroacetic anhydride is heated at 100° C. for 6 hours in a glass-lined bomb with occasional shaking. The reaction mixture is then cooled and filtered, yielding 15 grams of crude product. Recrystallization from ether yields 2-methyl-3-trifluoroacetyl-5-methoxyindole (M.P.: 185–185.5° C.).

Analysis for $C_{12}H_{10}NO_2F_3$.—Calculated: C, 56.03%; H, 3.91%; N, 5.44%. Found: C, 56.15%; H, 4.18%; N, 5.23%.

EXAMPLE 2

The procedure of Example 1 is followed, using as reactants, in lieu of the trifluoroacetic anhydride and 2-methyl-5-methoxyindole used therein, the equivalent quantities of the appropriate halo-substituted acetic anhydrides and indoles appropriately substituted in the C–2 and C–5 positions of the indole nucleus so as to yield the following respective products:

3-trifluoroacetylindole,
3-trichloroacetyl-2,5-dimethylindole,
3-difluoroacetyl-2,5-dimethylindole,
2-methyl-3-difluorochloroacetyl-5-methoxyindole,
2-ethyl-3-fluoroacetyl-5-methylindole,
2-phenyl-3-dichloroacetyl-5-methoxyindole,
2-p-tolyl-3-trichloroacetyl-5-methoxyindole,
2-methyl-3-dichloroacetyl-5-nitroindole,
2-ethyl-3-trifluoroacetyl-5-methylindole,
2-methyl-3-chloroacetyl-5-cyanoindole,
2-butyl-3-trifluoroacetyl-5-benzyloxyindole,
2-allyl-3-trifluoroacetyl-5-methoxyindole,
2-methyl-3-difluoroacetyl-5-methylthioindole,
2-methyl-3-trifluoroacetyl-5-dimethylaminoindole,
2-methyl-3-dibromoacetyl-5-allyloxyindole,
2-methyl-3-trifluoroacetyl-5-benzylmercaptoindole,
2-vinyl-3-trifluoroacetyl-5-methoxyindole,
2 - p - methoxyphenyl - 3 - dichloroacetyl - 5 - methoxyindole, and
2 - p - chlorophenyl - 3 - bromochloroacetyl - 5 - methoxyindole.

The 2- and/or 5-substituted indoles used as starting materials above may be prepared by a Fisher indole synthesis using the corresponding para-substituted phenylhydrazine (the para-substituent becoming the 5-substituent of the indole) and a reagent having the formula $$CH_3—CO—R_2$$

(in which $R_2$ becomes the 2-substituent of the indole), or by following the procedures set forth in U.S. Patent No. 2,825,734.

EXAMPLE 3

Preparation of 1-(2-thenoyl)-2-methyl-3-trifluoroacetyl-5-methoxyindole

To a solution of 3.23 g. (0.013 mole) of 2-methyl-3-trifluoroacetyl-5-methoxyindole in 40 cc. of freshly distilled dimethylformamide (DMF) at 0° C. are added 1.3 g. (0.026 mole) of a sodium hydride-mineral oil suspension (51% NaH) under nitrogen. 4.95 grams (0.020 mole) of 2-thenoyl chloride in 10 cc. of DMF are then added and the mixture stirred for 3 hours at 0° C. Excess ether is then added and the reaction mixture stirred at 0° C. for 50 minutes. The mixture is then filtered, the precipitate washed with ether, and the ether solution washed twice with water, dried over sodium sulfate, and concentrated in vacuo. Chromatography on 200 g. of silica gel with 5% (v./v.) ether in petroleum ether as the eluent yields 1.2 g. of a yellow oil which solidified on cooling in Dry Ice. Recrystallization from 5% (v./v.) ether in petroleum ether (cooled in Dry Ice) yields 0.57 g. of 1-(2-thenoyl)-2-methyl-3-trifluoroacetyl-5-methoxyindole.

EXAMPLE 4

The procedure of Example 3 is followed, but using as reactants, in lieu of the 2-methyl-3-trifluoroacetyl-5-methoxyindole and 2-thenoyl chloride used therein, the equivalent quantities of the 3-haloacetyl indoles appropriately substituted in the C–2 and C–5 positions of the indole nucleus and the appropriate heteroaroyl chlorides so as to yield the following respective products:

1-(5-chloro-2-furoyl)-3-trifluoroacetylindole,
1-(2,5-dimethyl-3-thenoyl-3-trichloroacetyl-2,5-dimethylindole,
1-(5-methoxy-2-thenoyl)-3-difluoroacetyl-2,5-dimethylindole,
1-(5-nitro-2-furoyl)-2-methyl-3-difluorochloroacetyl-5-methoxyindole,
1-(3,4,5-trimethyl-2-thenoyl)-2-ethyl-3-fluoroacetyl-5-methylindole,
1-(2-methyl-5-bromo-3-furoyl)-2-phenyl-3-dichloroacetyl-5-methoxyindole,
1-(3-methoxy-2-thenoyl)-2-p-tolyl-3-trichloroacetyl-5-methoxyindole,
1-(4-methyl-2-thenoyl)-2-methyl-3-dichloroacetyl-5-nitroindole,
1-(4-methyl-3-thenoyl)-2-ethyl-3-trifluoroacetyl-5-methylindole,
1-(5-methyl-3-thenoyl)-2-butyl-3-trifluoroacetyl-5-benzyloxyindole,
1-(5-ethyl-2-thenoyl)-2-allyl-3-trifluoroacetyl-5-methoxyindole,
1-p-methoxybenzoyl-2-methyl-3-difluoroacetyl-5-methylthioindole,
1-(5-t-butyl-2-thenoyl)-2-methyl-3-trifluoroacetyl-5-dimethylaminoindole,
1-(5-phenyl-2-thenoyl)-2-methyl-3-dibromoacetyl-5-allyloxyindole,
1-(3,4-diphenyl-2-thenoyl)-2-methyl-3-trifluoroacetyl-5-benzylmercaptoindole, 1-(5-α-phenylethyl-2-thenoyl)-2-vinyl-3-trifluoroacetyl-5-methoxyindole,
1-(3'-thenoyl)-2-p-methoxyphenyl-3-dichloroacetyl-5-methoxyindole,
1-(5-chloro-2-thenoyl)-benzoyl-2-p-chlorophenyl-3-bromochloroacetyl-5-methoxyindole, and
1 - (3 - bromo - 2 - thenoyl) - 2 - methyl - 3 - trifluoroacetyl-5-methoxyindole.

In a similar manner, the procedure of Example 3 is followed using, in place of 2-thenoyl chloride, an equivalent quantity of the following acid chlorides (prepared in each case by heating the free acid with thionyl chloride and removing the excess thionyl chloride in vacuo):

4-bromo-3-thenoyl chloride
3-iodo-2-thenoyl chloride
3,4,5-trichloro-2-thenoyl chloride
5-methyl-3,4-dibromothenoyl chloride
5-acetyl-3-thenoyl chloride
2,5-dimethyl-4-acetyl thenoyl chloride
5-methylthio-2-thenoyl chloride
5-isobutylthio-2-thenoyl chloride
2-methylthio-5-methyl-3-thenoyl chloride
4-methylsulfonyl-2-thenoyl chloride
5-methylsulfonyl-2-thenoyl chloride
5-p-methoxyphenylsulfonyl-2-thenoyl chloride
5-carbomethoxy-2-thenoyl chloride
5-ethyl-2-furoyl chloride
4-t-butyl-2-furoyl chloride
3,5-dimethyl-2-furoyl chloride
5-(1-methylcyclohexyl)-2-furoyl chloride
2-methyl-5-phenyl-3-furoyl chloride
2-methyl-5-p-methoxyphenyl-3-furoyl chloride
3,4-diphenyl-2-furoyl chloride
5-(2-furyl)-2-furoyl chloride
5-benzyl-2-furoyl chloride
5-furfuryl-2-furoyl chloride
5-bromo-2-furoyl chloride
4-methoxy-5-methyl-2-furoyl chloride
3,4-dimethoxy-2-furoyl chloride
5-cyclohexyloxy-2-furoyl chloride
3-cyano-2-furoyl chloride
5-methyl-4-acetyl-2-furoyl chloride
5-formyl-2-furoyl chloride
5-chloro-4-t-butyl-2-furoyl chloride
5-formyl-2-phenyl-3-furoyl chloride
5-ethoxymethyl-2-furoyl chloride
5-methoxymethyl-2-furoyl chloride
5-acetonyl-2-methyl-3-furoyl chloride
5-benzyloxymethyl-2-furoyl chloride
5-benzylthiomethyl-2-furoyl chloride
5-furfurylthiomethyl-2-furoyl chloride
5-benzylsulfonylmethyl-2-furoyl chloride
5-butylthiomethyl-2-furoyl chloride
5-phenoxy-2-furoyl chloride
5-phenylthio-2-furoyl chloride
5-carbomethoxy-2-furoyl chloride The corresponding 1-heteroaroyl-2-methyl-3-fluoroacetyl-5-methoxyindoles are obtained.

EXAMPLE 5

1-(1-methylpyrrole-2-carbonyl)-2-methyl-3-trifluoro-acetyl-5-methoxyindole (A) p-Nitrophenyl-1-methylpyrrole - 2 - carboxylate.—In a 500 ml. round bottom flask (all equipment flame dried) is added 13.9 g. of p-nitrophenol and 3.7 g. of 1-methyl-pyrrole-2-carboxylic acid in 250 ml. dry tetrahydrofuran. Through a dropping funnel is added over 30 minutes 20.6 g. of dicyclohexylcarbodiimide in 100 ml. of dry tetrahydrofuran. The reaction is allowed to run overnight with stirring. The dicyclohexylurea which forms during the reaction is filtered. The filter cake is washed with dry tetrahydrofuran. The solution is evaporated to dryness. The solid is taken up in benzene and washed with sodium bicarbonate solution and then with water and dried over anhydrous sodium sulfate. The solution is concentrated under vacuum to dryness. The solid p-nitrophenyl-1-methyl-pyrrole-2-carboxylate is then recrystallized from benzene.

(B) 1-(1-methylpyrrole-2-carbonyl)-2-methyl - 3 - trifluoroacetyl-5-methoxyindole.—The procedure of Example 3 is followed, using the product from part A in equivalent quantity in place of 2-thenoylchloride, to yield 1-(1-methylpyrrole-2-carbonyl)-2-methyl-3-trifluoroacetyl - 5 - methoxyindole.

(C) Similarly, when any of the following acids are used in equivalent quantities in the procedure of part A in place of 1-methylpyrrole-2-carboxylic acid, and the product is used in equivalent quantities in part B, in place of the p-nitrophenyl - 1 - methylpyrrole-2-carboxylate the corresponding 1-acyl-2-methyl-3-trifluoroacetyl - 5 - methoxyindole is obtained.

2-(2-pyridyl)-3-furoic acid
1-phenyl-3-cyanopyrrole-2-carboxylic acid
1-allyl-3-cyanopyrrole-2-carboxylic acid
1-benzyl-3-cyanopyrrole-2-carboxylic acid
1-cyclohexyl-3-cyanopyrrole-2-carboxylic acid
1-phenylpyrrole-3-carboxylic acid
1-butyl-4-nitropyrrole-2-carboxylic acid
1-methyl-4-nitropyrrole-2-carboxylic acid
1,2,4-trimethylpyrrole-3-carboxylic acid
5-acetyl-1,2,4-trimethylpyrrole-3-carboxylic acid

EXAMPLE 6

(A) 5-dimethylcarbamido-2-thenoic acid.—A solution of 0.02 mole of 5-carbomethoxy-2-thenoyl chloride (prepared by heating the free acid with thionyl chloride) in ether is added with stirring and ice cooling to a solution of excess dimethylamino in ether. The mixture is then washed with water followed by dilute HCl and water again. After it is dried over sodium sulfate, the solution is evaporated to give methyl 5-dimethylamino-2-thenoate. This product (0.02 mole) is stirred with 40 ml. of N NaOH in 90% aqueous ethanol at room temperature for 18 hours. The mixture is then concentrated to ⅓ volume in vacuo, poured into water and extracted with ether. The aqueous solution is then acidified to give 5-dimethyl-carbamido-2-thenoic acid.

When the dimethyl amine is replaced with diethylamine, methyl propyl amine, or dibutylamine, the corresponding amidothenoic acids are obtained.

(B) 5-(4-morpholino)carbonyl-2-thenoic acid.—The procedure of part A is followed using an equivalent quantity of morpholine or pyrrolidine in place of the dimethylamine, to give respectively 5-(4-morpholine)carbonyl-2-thenoic acid and 5(1-pyrrolidinyl)carbonyl-2-thenoic acid.

(C) 5-dimethylcarbamido-2-furoic acid.—The procedure of part A is followed using 5-carbomethoxy-2-furoyl chloride (prepared by heating the free acid with thionyl chloride) in place of the corresponding thenoyl chloride to give 5-dimethyl carbamido-2-furoic acid. When the dimethylamine is also replaced with diethylamine, methyl propylamine, dibutylamino, morpholine or pyrrolidine, there is obtained 5-diethylcarbamido, 5-methylpropylcarbamido, 5-dibutylcarbamido, 5-(4-morpholino) carbonyl or 5-(1-pyrrolidinyl)carbonyl-2-furoic acid respectively.

(D) 5-dimethylsulfamyl-2-furoic acid.—A solution of 0.02 mole of 5-chlorosulfonyl-2-furoic acid in 40 ml. of 1,2-dimethoxyethane is added to a cold solution of 0.06 mole of dimethylamine in 200 ml. of 1,2-dimethoxyethane. The mixture is stirred and kept at 0–5° C. for 4 hours and then at ambient temperature for 18 hours. It is then concentrated in vacuo to ¼ volume and poured into ice and water. After acidification with dilute HCl, the mixture is extracted with ether, the extract dried over $Na_2SO_4$ and evaporated to yield 5-dimethylsulfamyl-2-furoic acid.

When the dimethylamine in the above procedure is replaced with diethylamino, methylpropylamine, dibutylamino, morpholine or pyrrolidine, the corresponding 5-dialkylsulfamyl-2-furoic acids are obtained.

(E) When the above acids are used, in the form of their acid chlorides (prepared by heating with excess thionyl chloride and removing the excess in vacuo) are used in the procedure of Example 5 in place of the 2-thenoyl chloride, or in the form of their p-nitro-phenyl esters (prepared by the procedure of Example 5A) in the procedure of Example 5B in place of the p-nitrophenyl-1-methylpyrrole-2-carboxylate, the corresponding 1-acyl-2-methyl-5-trifluoromethylindoles are obtained.

(F) 5-difluoromethyl-2-thenoic acid.—A solution of 0.05 mole of methyl 5-formyl-2-thenoate in benzene is treated with 0.1 mole of phosphorous pentachloride at room temperature for 1 hour and then at the reflux temperature for 2 hours. The solution is poured into crushed ice. The organic layer is washed with saturated $HaHCO_3$, water and dried over $Na_2SO_4$. The solution is evaporated in vacuo to a syrup and the crude methyl 5-dichloromethyl-2-thenoate is redissolved in toluene and heated at the reflux temperature with 0.2 mole of silver fluoride for 24 hours. After filtration, the solution is concentrated in vacuo and chromatographed on 400 g. of acid-washed alumina to yield methyl 5-difluoromethyl-2-thenoate. Hydrolysis of the ester with N NaOH in 80% aqueous ethanol at room temperature for 18 hours gives 5-difluoromethyl-2-thenoic acid.

The same compounds are obtained by alternative procedure:

A mixture of 0.05 mole of methyl 5-formyl-2-thenoate, 0.05 ml. of water and 0.2 mole of $SF_4$ is heated in an autoclave at 120–150° C. for 8–12 hours. The mixture is poured into crushed ice and extracted with ether. The ether solution is washed with saturated $NaHCO_3$, $H_2O$ and dried over $Na_2SO_4$. After evaporation, the crude mixture is chromatographed on a column of 300 g. of acid-washed alumina, using ether-petroleum ether (v./v.) 10–50% as eluent to give methyl 5-difluoromethyl-2-thenoate which is saponified as before.

When the above procedure is followed using methyl-5-formyl-2-furoate in place of the methyl formylthenoate, there is obtained 5-difluoromethyl-2-furoic acid.

(G) 5-trifluoromethyl-2-thenoic acid.—The second or alternative procedure in part F is followed using 5-carbomethoxy-2-thenoic acid in place of the methyl 5-formyl-2-thenoate. The product methyl-5-trifluoromethyl-2-thenoate is hydrolyzed, as in that procedure, with N NaOH in aqueous ethanol, to give 5-trifluoro-methyl-2-thenoic acid.

When 5-carbomethoxy-2-furoic acid is used in the above procedure there is similarly obtained 5-trifluoromethyl-2-furoic acid.

EXAMPLE 7

Preparation of tertiary-butyl-β-[1-(5-chloro-2-thenoyl)-2-methyl-5-methoxy-3-indolyl]-β-trifluoromethyl glycidate To a solution of 0.03 mole of 1-(5-chloro-2-thenoyl)-2-methyl-3-trifluoroacetyl-5 - methoxyindole and 0.045 mole of t-butyl chloroacetate in 250 ml. of dimethoxyethane are added, in portions, 5.2 g. of potassium t-butoxide at 0° C. with stirring and under nitrogen. The reaction mixture is stirred at room temperature for 18 hours and poured into 1 liter of iced water containing 3 ml. of acetic acid. The product is extracted with ether, dried over sodium sulfate, filtered and concentrated in vacuo. The residue is chromatographed on silica gel using mixtures of ether-petroleum ether in the range of 50–100% ether (v./v.) as the eluent to give the corresponding tertiary-butyl-β-[1-(5-chloro-2-thenoyl)-2-methyl-5-methoxy - 3-indolyl]-β-trifluoromethyl glycidate.

EXAMPLE 8

Preparation of α-[1-(5-chloro-2-thenoyl) - 2 - methyl - 5 - methoxy-3-indolyl]-α-trifluoromethyl acetaldoxime A mixture of 3.5 g. of tertiary-butyl-β-[1-(5-chloro-2-thenoyl)-2-methyl-methoxy - 3 - indolyl] - β - trifluoromethyl glycidate and about 500 mg. of copper powder is heated in an oil bath at 150–200° C. at 0.1 mm. Hg with stirring. As soon as the pyrolysis slows down, the reaction mixture is cooled in ice and the resulting α-[1-(5-chloro-2-thenoyl)-2-methyl-5-methoxy-3-indolyl] - α - trifluoromethyl acetaldehyde extracted with ether. The ethereal solution is concentrated in vacuo, dissolved in 50 ml. ethanol and treated with 2 g. of hydroxylamine acetate. The mixture is poured into water and extracted with ether. The ethereal solution is washed with dilute hydrochloric acid, aqueous sodium bicarbonate, water and dried. Evaporation of the solution gives a syrup which is chromatographed on 60 g. of silica gel using mixtures of ether-petroleum ether in the range of 30–60% ether (v./v.) as the eluent to give the corresponding α-[1-(5-chloro-2-thenoyl)-2-methyl-5-methoxy - 3 - indolyl]-α-trifluoromethyl acetaldoxime.

EXAMPLE 9

Preparation of α-[1-(5-chloro-2-thenoyl)-2-methyl-5-methoxy-3-indolyl] - α - trifluoromethyl acetaldoxime ethyl carbonate To a solution of 150 mg. of α-[1-(5-chloro-2-thenoyl) benzoyl-2-methyl-5-methoxy-3-indolyl] - α-trifluoromethyl acetaldoxime in 3 ml. of pyridine is added about 0.2 g. of ethylchloroformate at 0° C. with stirring. The mixture is then stirred at room temperature for 2 hours, poured into water and extracted with ether. The ethereal solution is washed with water, dilute HCl and aqueous sodium bicarbonate and then dried over sodium sulfate. Evaporation of the solvent gives 140 mg. of the corresponding acetaldoxime ethyl carbonate.

EXAMPLE 10

Preparation of α-[1-(5-chloro-2-thenoyl) - 2 - methyl - 5 - methoxy-3-indolyl]-α-trifluoromethyl acetonitrile 295 milligrams of α-[1-(5-chloro-2-thenoyl)-2-methyl-5-methoxy-3-indolyl]-α-trifluaromethyl acetaldoxime ethyl carbonate are heated at 1 mm. Hg. in an oil bath at 150°–160° C. for 10 minutes. After cooling, the hard yellow film is dissolved in 20% (v./v.) ether in petroleum ether and the solution passed through an alumina (6 g.) column and eluted with 600 ml. of the same solvent to yield the corresponding α-[1-(5-chloro - 2 - thenoyl) - 2 - methyl-5-methoxy-3-indolyl] - α - trifluoromethyl acetonitrile.

EXAMPLE 11

(A) Preparation of methyl α-trifluoromethyl-α-[1-(5-chloro-2-thenoyl)-2-methyl-5-methoxy - 3 - indolyl] - acetate.—A solution of 0.01 mole of α-[1-(5-chloro-2-thenoyl)-2-methyl-5-methoxy - 3 - indolyl] - α - trifluoromethyl acetonitrile and 0.01 mole of methanol in 50 ml. dry ether is treated with anhydrous hydrogen chloride at 0°–5° C. until the resulting imino methyl ester hydrochloride precipitates. The precipitate is collected, washed with ether and then treated with water to undergo hydrolysis and yield the corresponding methyl α-trifluoromethyl-α-[1-(5-chloro-2-thenoyl)-2-methyl - 5 - methoxy-3-indolyl]-acetate.

(B) In accordance with the above procedures, but substituting ethanol, isopropanol and tertiary butanol, respectively, for the methanol used therein, there are obtained the corresponding ethyl, isopropyl and tertiary butyl esters, respectively.

EXAMPLE 12

Preparation of α-trifluoromethyl-α-[1-(5-chloro-2-thenoyl)-2-methyl-5-methoxy-3-indolyl]acetic acid A solution of 3 g. of methyl α-trifluoromethyl-α-[1-(5-chloro-2-thenoyl)-2-methyl-5-methoxy - 3 - indolyl]-acetate in 80 ml. of dioxane and 20 ml. of 2.5 N hydrochloric acid is maintained at 50 °C. for several hours under a nitrogen atmosphere. The reaction mixture is concentrated in vacuo to about 30 ml., diluted with 200 ml. of water, and extracted with ether. The ethereal solution is washed with water, dried over sodium sulfate, filtered, and evaporated to a residue. The residue is chromatographed on 200 g. of silica gel using mixtures of ether in petroleum ether (v./v. 30%–100%) as eluent to yield α-trifluoromethyl-α-[1-(5-chloro-2-thenoyl)-2-methyl - 5 - methoxy-3-indolyl] acetic acid.

EXAMPLE 13

(A) The procedures of Examples 7–12 are followed using an equivalent quantity of the 1-(5-chloro-2-furoyl)-3-trifluoroacetylindole of Example 4 as the starting material in place of the 1-(5-chloro-2-thenoyl)-2-methyl-3-trifluoroacetyl-5-methoxyindole of Example 7, and equivalent quantities of the respective indolyl intermediates thereafter, to yield the corresponding α-trifluoromethyl-α-[1-(5-chloro-2-furoyl) - 3 - indolyl] acetic acid.

(B) In accordance with the above procedures, an equivalent quantity of each of the other N–1 acylated 3-α-haloacetyl indoles of Examples 4, 5 and 6 is subjected to the procedures outlined in Examples 7–12 to yield, respectively, the corresponding α-halogenated methyl N–1 acylated 3-indolylacetic acids.

EXAMPLE 14

Preparation of α-trifluoromethyl-α-[1-(5-chloro - 2 - thenoyl)-2-methyl-5-methoxy-3-indolyl] acetic acid anhydride To a solution of 0.05 mole of α-trifluoromethyl-α-[1-(5-chloro-2-thenoyl)-2-methyl - 5 - methoxy - 3 - indolyl] acetic acid in 300 ml. of dry tetrahydrofuran is added 0.025 mole of dicyclohexyl carbodiimide with ice-cooling and stirring. The mixture is allowed to remain at 0–5° C. for 1 hour and then at room temperature (about 25° C.) for an additional 4–6 hours. The solution is filtered to remove the dicyclohexylurea formed, and concentrated in vacuo to a residue. The resulting anhydride is recrystallized from a mixture of benzene and petroleum ether.

EXAMPLE 15

(A) The procedure of Example 14 is followed using an equivalent quantity of α-trifluoromethyl-α-[1-(5-chloro-2-furoyl) chlorobenzoyl-3-indolyl] acetic acid in place of the α - trifluoromethyl - α - [1-(5-chloro-2-thenoyl)-2-methyl-5-methoxy-3-indolyl] acetic acid used therein to obtain the corresponding α-trifluoromethyl-α-[1-(5-chloro-2-furoyl)-3-indolyl] acetic acid anhydride.

(B) In accordance with the above procedure, an equivalent quantity of each of the other α-halogenated methyl N–1 acylated 3-indolylacetic acids of Example 13 is used in place of the α-trifluoromethyl-α-[1-(5-chloro-2-thenoyl)-2-methyl-5-methoxy-3-indolyl] acetic acid of Example 14 to yield, respectively, the corresponding anhydride.

EXAMPLE 16

(A) Preparation of N,N-dimethyl-α-trifluoromethyl-α-[1 - chlorobenzoyl - 2 - methyl - 5 - methoxy-3-indolyl] acetamide.—A solution of 0.01 mole of α-trifluoromethyl - [1 - (5 - chloro - 2 - thenoyl)-2-methyl-5-methoxy-3-indolyl] acetic acid anhydride in 50 ml. tetrahydrofuran is treated with 0.02 mole of anhydrous dimethylamine at 0° C. with stirring. After one-half hour, the solution is filtered to remove the dimethylamine salt and concentrated in vacuo to yield N,N-dimethyl-α-trifluoromethyl - α - [1 - (5 - chloro-2-thenoyl)-2-methyl-5-methoxy-3-indolyl] acetamide which is recrystallized from a mixture of benzene and petroleum ether.

(B) In accordance with the above procedure, but substituting an equivalent quantity of isopropylamide, diethanolamine, aniline, monomethylaniline, benzylamine, para-chloroaniline, β-methoxyethyl amine, morpholine and para-methoxy aniline, respectively, in place of the dimethylamine used therein, there are obtained, respectively, the corresponding N-substituted acetamides.

(C) The procedure of Example 16A is followed using dry ammonia gas instead of dimethylamine. The ammonia is bubbled through the tetrahydrofuran solution of the indolyl acid anhydride. The product is α-trifluoromethyl-α - [1 - (5 - chloro - 2 - thenoyl)-2-methyl-5-methoxy-3-indolyl] acetamide.

(D) The procedure of Example 16C is followed using equivalent quantities of the other indolyl acid anhydrides prepared in Example 15 to yield the corresponding indolyl acetamides.

EXAMPLE 17

(A) Preparation of isopropyl - α - trifluoromethyl-α-[1 - (5 - chloro - 2 - thenoyl) - 2 - methyl-5-methoxy-3-indolyl] acetate.—A solution of 0.01 mole of α-trifluoromethyl - α - [1 - (5 - chloro-2-thenoyl)-2-methyl-5-methoxy-3-indolyl] acetic acid anhydride, 0.01 mole of triethylamine and 0.01 mole of isopropanol in 50 ml. of dimethoxyethane is allowed to stand at 0° C. for 1 hour and then at room temperature for 4–6 hours. The solution is concentrated in vacuo to about 10 ml. and diluted with 50 ml. of ether. The ether solution is filtered from the triethylamine salt and then evaporated to give the isopropyl ester.

(B) In accordance with the above procedure, but substituting an equivalent quantity of methanol, ethanol, tertiary-butanol, benzyl alcohol and β-phenylethyl alcohol, respectively, in place of the isopropanol used therein, there are obtained, respectively, the corresponding esters.

EXAMPLE 18

The procedures of Examples 16 and 17 are followed, respectively, using an equivalent quantity of α-trifluoromethyl - α - [1 - (5 - chloro - 2 - furoyl)-3-indolyl] acetic acid anhydride in place of the α-trifluoromethyl-α-[1-(5-chloro - 2 - thenoyl) - 2 - methyl - 5 - methoxy - 3 - indolyl] acetic acid anhydride used therein to obtain, respectively, the corresponding N-substituted acetamides and the corresponding esters.

In accordance with the above procedure, an equivalent quantity of each of the other α-halogenated N–1 acylated 3-indolylacetic acid anhydrides of Example 15 is used in place of the α-trifluoromethyl - α - [1 - (5 - chloro-2-thenoyl) benzoyl - 2 - methyl-5-methoxy-3-indolyl] acetic acid anhydride of Examples 16 and 17 to yield, respectively, the corresponding N-substituted acetamides and the corresponding esters.

EXAMPLE 19

(A) Preparation of the morpholine salt of α-trifluoromethyl - α - [1 - (5 - chloro - 2 - thenoyl)-2-methyl-5-methoxy-3-indolyl] acetic acid.—To a solution of 0.01 mole of α-trifluoromethyl-α-[1 - (5 - chloro-2-thenoyl)-2-methyl-5-methoxy-3-indolyl] acetic acid in 100 ml. of ether at 0° C. is added a solution of 0.01 mole of morpholine in 50 ml. of ether, dropwise, with stirring. The mixture is filtered and the resulting crystalline morpholine salt of α - trifluoromethyl - α - [1 - (5 - chloro-2-thenoyl)-2-methyl-5-methoxy-3-indolyl] acetic acid is washed with ether and dried in vacuo.

(B) The procedure of Example 19A above is followed using, in place of the indolyl acid used above, an equivalent quantity of each of the indolyl acids prepared in Examples 12 and 13, to produce the morpholine salt of each of said acids.

(C) The procedure of Example 19A above is followed using, in place of morpholine, an equivalent amount of each of the following amines, to yield the corresponding amine salts of α-trifluoromethyl-α-[1-(5-chloro-2-thenoyl)-2-methyl-5-methoxy-3-indolyl] acetic acid; trimethylamine, triethylamine, n-butylamine, aniline, chlorine, 2,3-xylidine and piperazine.

EXAMPLE 20

(A) Preparation of sodium α - trifluoromethyl - α - [1-(5 - chloro - 2 - thenoyl) - 2 - methyl-5-methoxy-3-indolyl] acetate.—To a solution of 0.01 mole of α-trifluoromethyl-α-[1 - (5 - chloro - 2 - thenoyl) - 2 - methyl-5-methoxy-3-indolyl] acetic acid in 100 ml. of methanol at 0° C. is added a solution of 0.01 mole of sodium methoxide in 30 ml. of methanol with stirring. The mixture is concentrated in vacuo at 10–25° C. to about 30 ml. and diluted with 200 ml. ether. The precipitated sodium salt is collected on a filter, washed with ether and dried in vacuo.

(B) The procedure of Example 20A is followed using an equivalent quantity of each of the indolyl acids prepared in Example 13, to obtain the corresponding sodium salt of each of said acids.

(C) The procedure of Example 20A is followed using 0.01 mole of each of the following alkoxides or hydroxides in place of sodium methoxide, to produce the corresponding metal salts: potassium methoxide, aluminum isopropoxide, magnesium hydroxide and calcium hydroxide.

EXAMPLE 21

α-Trifluoromethyl-[1-(4-hydroxy-2-thenoyl)-2-methyl-5-methoxy-3-indolyl] acetic acid (A) Methyl-4-benzyloxy-3-methyl-2-thenoate.—To a solution of 0.02 mole methyl-4-hydroxy-3-methylthiophene-2-carboxylate in 100 ml. dimethyl-formamide is added 0.022 mole of potassium t-butoxide with ice-cooling and stirring. After one-half hour, 0.022 mole of benylchloride is added and the mixture is stirred at 0–5° for 2 hours and then at room temperature for 18 hours. The solution is poured into water and extracted with ether. The product is chromatographed on 300 g. acid-washed alumina using ether-n-hexane (v./v.) 20–60% as eluent.

(B) 4-benzyloxy-3-methyl-2-thenoic acid.—The product of part A is stirred with excess 2 N NaOH in 80% aqueous ethanol for 18 hours. The mixture is then diluted with water, filtered and acidified. The precipitated acid is filtered, washed and dried.

(C) α - Trifuoromethyl-[1-(4-benzyloxy-2-thenoyl)-2-methyl-5-methoxy-3-indolyl] acetic acid.—The procedure of Example 3 is followed, using the acid chloride of the product of Example 21B above in equivalent quantity in place of the 2-thenoyl chloride used therein, the acid chloride of the product of part B being prepared by heating with excess thionyl chloride followed by removal of the excess in vacuo. The product, 1-(5-benzyloxy-2-thenoxyl)-2-methyl-5-methoxy-3-indolyl is then converted by the procedure of Examples 7–12 to α-trifluoromethyl-[1 - (4 - benzyloxy - 2-thenoyl)-2-methyl-5-methoxy-3-indolyl] acetic acid.

(D) α - Trifluoromethyl - [1-(4-hydroxy-2-thenoyl)-2-methyl-5-methoxy-3-indolyl] acetic acid.—The product of part C is hydrogenated in ethanolic solution at room temperature and 40 p.s.i. over a 10% palladium on charcoal catalyst until the reaction is substantially complete. The catalyst is removed by filtration and the solution is evaporated to dryness in vacuo. The residue is chromatographed on a silica gel column using ether-ethyl acetate as the eluent, to give α-trifluoromethyl-[1-(4-hydroxy-2-thenoyl)-2-methyl-5-methoxy-3-indolyl] acetic acid.

EXAMPLE 22

(A) Methyl α-trifluoromethyl-[1-(5-nitro-2-thenoyl)-2-methyl-5-methoxy-3-indolyl] acetate.—The procedure of Example 3 is followed using 5-nitro-2-thenoyl chloride in place of 2-thenoyl chloride. The product is then used in the procedures of Example 7–11 to produce methyl α - trifluoromethyl - [1 - (5 - nitro-2-thenoyl)-2-methyl-5-methoxy-3-indolyl] acetate.

When 5-nitro-3-thenoyl chloride, 5-nitro-2-furoyl chloride, 4-nitro-2-thenoyl chloride, 2-nitro-3-thenoyl chloride, 3-nitro-2-furoyl chloride or 3,5-dinitro, 2-thenoyl chloride (all prepared by heating the free acid with excess thionyl chloride) are used in the above procedure, the corresponding 1-acyl indole ester is obtained.

(B) Methyl α-trifluoromethyl-[1-(5-dimethylamino-2-thenoyl)-2-methyl-5-methoxy-3-indolyl] acetate.—To a solution of 0.4 g. of the product of part A in 20 ml. of distilled dimethoxyethane is added 1.5 ml. of glacial acetic acid and 0.5 ml. of 37% solution of aqueous formaldehyde. This mixture is reduced with Raney nickel at 40 p.s.i. and room temperature. After the theoretical amount of hydrogen has reacted, the reaction mixture is filtered, concentrated in vacuo to a small volume and diluted with ether. The ether solution is washed with anhydrous sodium sulfate and concentrated in vacuo to give the 5-dimethylamino indolyl ester removed above.

(C) Methyl α-trifluoromethyl-[1-(5-amino-2-thenoyl)-2-methyl-5-methoxy-3-indolyl] acetate.—0.025 M of the product of part A in 100 ml. of ethanol is hydrogenated in the presence of 120 mg. of 10% palladium on charcoal catalyst at 40 p.s.i. at room temperature. After 0.075 M of hydrogen has been consumed, the hydrogenation is stopped and the solution filtered to remove the catalyst. The filtrate is concentrated to dryness to give the above named compound.

(D) Methyl α-trifluoromethyl-[1-(5-acetamino-2-thenoyl)-2-methyl-5-methoxy-3-indolyl] acetate.—To 0.4 mg. of the product of part A in 30 ml. of anhydrous ethyl acetate is added 0.306 g. acetic anhydride. The mixture is reduced with Raney nickel at room temperature and 40 p.s.i. After the theoretical amount of hydrogen has been absorbed, the catalyst is removed by filtration. The solution is concentrated in vacuo to a small volume and poured into an ice-water-ether mixture. The ether layer is separated and the aqueous layer is washed with ether. The combined ether extracts are washed with sodium bicarbonate followed by water, dried with anhydrous sodium sulfate and concentrated in vacuo to dryness. The product is crystallized from benzene and ether.

EXAMPLE 23

(A) α-Trifluoromethyl - [1 - (5 - fluoro-2-thenoyl)-2-methyl-5-methoxy-3-indolyl] acetic acid.—To 4.3 moles of a 15% solution of n-butyl lithium in benzene, under nitrogen, is added 1.0 g. of 2-fluorothiophene in 4 cc. of dry ether. The mixture is stirred at room temperature over night and then poured on dry ice. It is acidified with 2.5 N HCl and extracted with ether. The ether solution is then extracted four times with saturated aqueous $NaHCO_3$. The bicarbonate solutions are acidified with concentrated HCl which has been diluted with an equal volume of water and extracted with ether. The ether solution is washed with water and dried over $MgSO_4$, after which it is concentrated to dryness, giving 645 mg. of 5-fluorothenoic acid, M.P. 135–140°. This product is treated with charcoal in ether solution and recrystallized from ether several times. It is finally sublimed at 80°. M.P. 139–141°.

Analysis.—Calcd.: C, 41.11; H, 2.07; S, 21.95; S, 13.00. Found: C, 41.44; H, 2.4; S, 21.82; F, 12.4.

pK in 50% aqueous methanol 4.3.

(B) 5-fluoro-2-thenoyl chloride.—5-fluoro-2-thenoic acid is refluxed with thionyl chloride in benzene solution with azeotropic removal of byproduct water until the reaction is substantially complete. The solvent and excess thionyl chloride are removed by distillation in vacuo to leave a residue of 5-fluoro-2-thenoyl chloride.

(C) α-Trifluoromethyl-[1-5-fluoro-2-thenoyl)-2-methyl-5-methoxy-3-indolyl] acetic acid.—The procedure of Example 3 is followed using the product of part B above in place of 2-thenoyl chloride. The product is then used in the procedures of Examples 7–12 to produce the above compound.

Various changes and modifications may be made in carrying out the present invention with departing from the spirit and scope thereof. Insofar as these changes and modifications are within the purview of the annexed claim, they are to be considered as part of our invention.

We claim:

1. A compound of the formula:

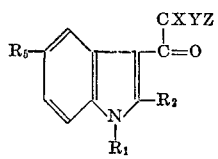

in which:

$R_1$ is selected from the group consisting of thenoyl, furoyl and pyrrole carbonyl and substituted thenoyl, furoyl and pyrrole carbonyl in which the said substituents are selected from the group consisting of halogen, lower alkyl, allyl, lower alkylthio, lower alkoxy, phenoxy, phenyl cyclohexyl, lower alkoxyphenoyl, halogenophenyl, phenyl lower alkyl, lower alkanoyl-lower alkyl, lower alkoxy-lower ankyl, lower alkanoyl, cyano, carb-lower-alkoxy, lower alkoxyphenylsulfonyl, lower alkylsulfonyl, phenylthio, benzylthio lower alkyl, benzylsulfonyl, lower alkyl benzyloxy lower alkyl, furfurylthio lower alkyl, nitro, and being no more than 1 substituent on said group;

$R_2$ is selected from the group consisting of hydrogen, lower alkyl, lower alkenyl, phenyl, tolyl, and benzyl;

$R_5$ is selected from the group consisting of hydrogen, lower alkyl, lower alkoxy, nitro, cyano, benzylmercapto, methylthio, dimethylamino, allyloxy and benzyloxy;

XYZ are selected from the group consisting of hydrogen and halogen is halogen has an atomic number of less than 53, no more than two being hydrogen at any one time.

References Cited

UNITED STATES PATENTS 3,201,414  8/1965  Shen _____ 260—319

OTHER REFERENCES

Elderfield: Heterocyclic Compounds, vol. 3, John Wiley and Sons, Inc., New York, 1952, pp. 8–13. D. 400–E4.

Yale: Jour. Med. & Pharm. Chem., vol. 1, No. 1, No. 1 (1959) pp. 121–133 RS 1.35.

NICHOLAS S. RIZZO, *Primary Examiner.*

J. A. NARCAVAGE, *Assistant Examiner.*

U.S. Cl. X.R.

260—247.1, 247.2, 268, 294.8, 295, 296, 326.13, 326.14, 326.15, 326.16, 999

UNITED STATES PATENT OFFICE
CERTIFICATE OF CORRECTION

Patent No. 3,426,038                                      February 4, 1969

Tsung-Ying Shen et al.

It is certified that error appears in the above identified patent and that said Letters Patent are hereby corrected as shown below:

Column 20, line 6, "is" should read -- said --.

Signed and sealed this 6th day of January 1970.

(SEAL)
Attest:

Edward M. Fletcher, Jr.                               WILLIAM E. SCHUYLER, JR.
Attesting Officer                                          Commissioner of Patents